Feb. 22, 1927.
G. E. HOWARD
LEER
Filed June 22, 1926
1,618,659
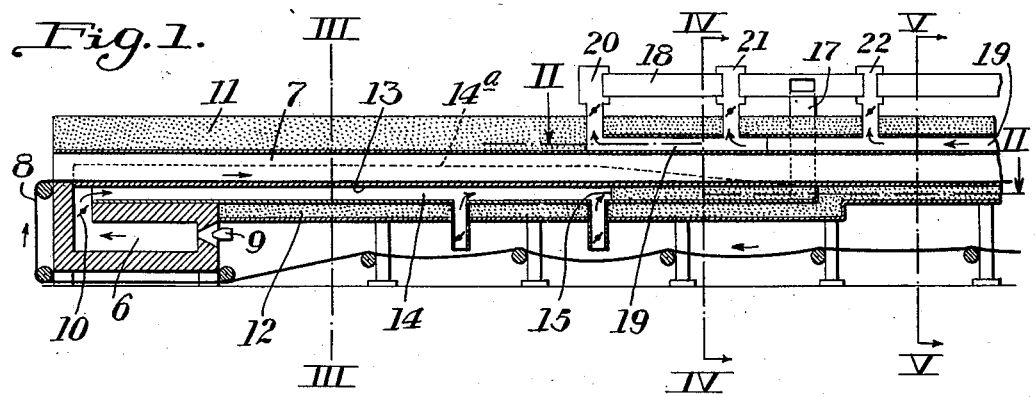
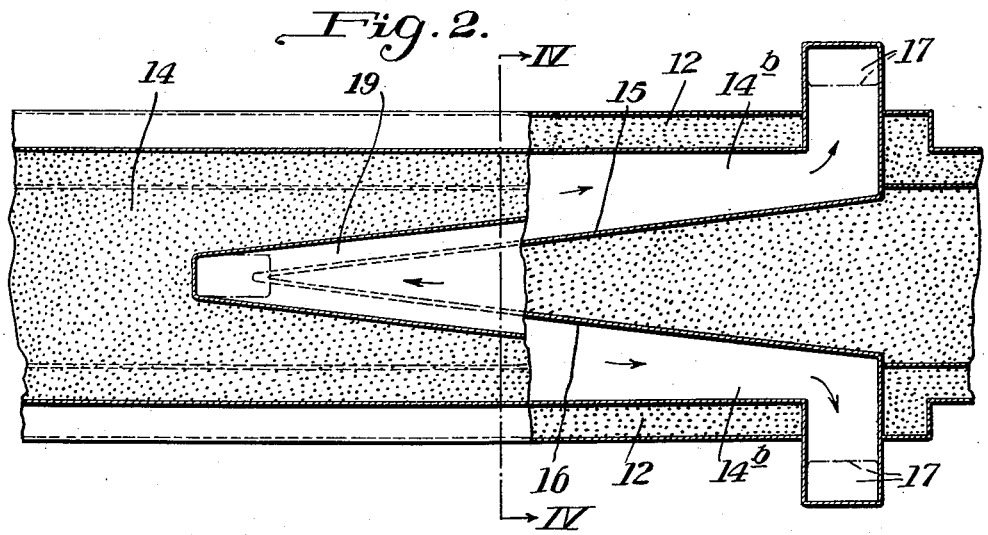
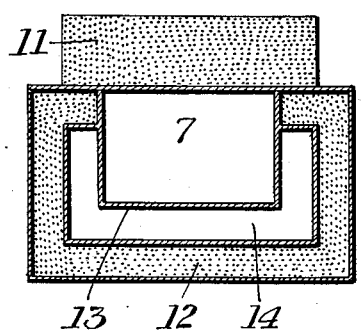
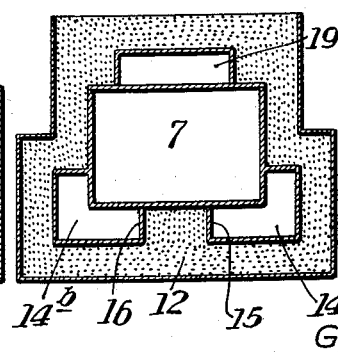
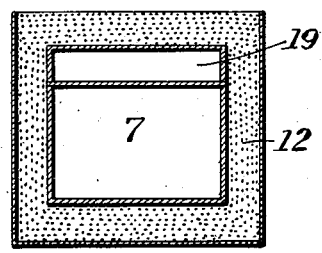
INVENTOR
GEORGE E. HOWARD
By Robson S. Brown
Attorney Patented Feb. 22, 1927.

1,618,659

UNITED STATES PATENT OFFICE.

GEORGE E. HOWARD, OF BUTLER, PENNSYLVANIA, ASSIGNOR TO HARTFORD-EMPIRE COMPANY, OF HARTFORD, CONNECTICUT, A CORPORATION OF DELAWARE.

LEER.

Application filed June 22, 1926. Serial No. 117,730.

My invention relates to leers such as are employed in the annealing of glassware, and is more particularly directed to means for controlling the temperature of the ware while being passed through a tunnel leer.

In some systems it is the practice to supply heat to the leer at the entrance point to raise the temperature of the glassware to the desired degree, and to decrease the supply of heat toward the discharge end of the leer so that the glassware will have become properly cooled when it emerges from the tunnel.

It has been found that in many instances there is a too abrupt drop in temperature between the heated portion of the leer and the cooler portion thereof, with the result that the ware is subjected to excessive strains.

It has been found further that there may be unevenness of temperature within the tunnel, by reason of the fact that heat is radiated therefrom more rapidly at some portions than at others. For instance, the leer is generally rectangular in cross section, and there is more rapid radiation of heat at the corners, and particularly the lower corners, than at other portions of the walls.

My invention has for its object the provision of means for more effectively controlling the temperature conditions throughout the length of a leer, and for securing a desired degree of uniformity in temperature conditions as between transversely spaced locations within the leer.

One form which my invention may take is shown in the accompanying drawing wherein Figure 1 is a longitudinal sectional view of a leer embodying my invention;

Fig. 2 is a horizontal sectional view, on an enlarged scale, taken on the line II—II of Fig. 1; and Figs. 3, 4 and 5 are vertical sectional views, on an enlarged scale, taken on the lines III—III, IV—IV and V—V respectively of Fig. 1, but with the belt conveyor omitted.

The leer is provided with a heating chamber 6 and with a tunnel portion 7. A carrier or belt conveyor 8 is employed for carrying the ware through the tunnel.

Fuel is supplied to the chamber 6 through a pipe 9 and a valve 10 controls passage of hot gases from the chamber 6 to a heating space 14 beneath the leer tunnel.

The tunnel 7 is rectangular in cross section as shown in Figs. 3, 4 and 5. Heat-insulating material 11 is placed upon the top of the tunnel and the bottom and sides thereof are surrounded by heat-insulating material 12.

The heating space 14, provided beneath the bottom wall 13 of the tunnel 7, extends upwardly and longitudinally for some distance along the sides of the tunnel 7, as shown in Fig. 3. The vertical spaces gradually decrease in height toward the discharge end of the leer, as indicated by the dotted line 14ª in Fig. 1, and, as will be seen by a comparison of Figs. 3 and 4, this arrangement effects a gradual reduction in the amount of heat supplied to the ware. Partitions 15 and 16 are located in the heating space 14 and meet at their ends, as shown in Fig. 2, in the form of a wedge, so that the amount of exposed heating surface on the underside of the wall 13 is gradually reduced, and heating of the lower corners is maintained for a longer period, in order to compensate for a greater radiation of heat at those points.

The space 14 is divided by the partitions 15 and 16 into branches 14ᵇ that communicate at their rear ends with vertical passages cate at their rear ends with vertical passages 17 which are formed in the walls of the leer and communicate at their upper ends with a conduit 18 through which hot gases may be exhausted.

The portion of the tunnel toward its discharge end, in which the air is gradually cooled, has a space 19 above its upper wall that communicates through passages 20, 21 and 22 with the conduit 18. These passages are provided with suitable dampers so that radiation of heat can be controlled.

An inspection of Figs. 2, 4 and 5 will show that the space 19 is gradually increased in width toward the discharge end of the tunnel, so that the upper corners of the tunnel will not be cooled so rapidly at that portion of the tunnel adjacent to the section line 4—4 as at the section line 5—5, since, as above stated, the corners of the tunnel tend to cool more rapidly than the other portions thereof, and by providing means which permit of greater radiation of heat from that portion of the tunnel between the corners, the normally relatively great radiation at the corners is compensated for.

It will be understood that the invention may be modified in construction, arrangement and mode of operation without departing from the scope of the invention as defined in the appended claims.

I claim as my invention:

1. The combination with a leer tunnel, of a heating compartment disposed beneath the bottom wall thereof and decreasing in cross sectional area toward the exit end of the tunnel.

2. The combination with a leer tunnel, of a heating compartment disposed beneath the bottom wall thereof, and means for partially filling in that portion of the compartment beneath the longitudinal center line of the tunnel so as to decrease the cross sectional area of said heating compartment toward the exit end of the tunnel.

3. The combination with a leer tunnel, of a compartment disposed beneath the bottom wall thereof and decreasing in cross sectional area toward the exit end of the tunnel, the decrease in area being effected by placing a filler of wedgelike form in that portion of the compartment beneath the longitudinal center line of the tunnel.

4. The combination with a leer tunnel, of a compartment disposed exteriorly of one wall thereof and gradually decreasing in cross sectional area toward one end of the tunnel.

5. The combination with a leer tunnel, of a compartment partially surrounding the tunnel and of gradually decreasing cross sectional area toward one end of the tunnel.

6. The combination with a leer tunnel, of a compartment beneath the tunnel and extending for a distance along the outer surfaces of the side walls of the tunnel, the upper walls of said compartment tapering downwardly toward one end of the tunnel.

7. The combination with a leer tunnel, of a compartment beneath the tunnel and extending for a distance along the outer surfaces of the side walls of the tunnel, the mid portion of said compartment being of gradually decreased area toward one end of the tunnel.

8. The combination with a leer tunnel, of means for supplying a relatively great amount of heat to the lower corners of the tunnel at points adjacent to the entrance to the tunnel, and means for retarding cooling of the upper corner portions of the tunnel at points adjacent to the exit end thereof.

9. The combination with a leer tunnel, of means for so controlling circulation of heated gases at certain corner portions thereof as to maintain desired temperature conditions within the tunnel.

10. The combination with a leer tunnel, of a compartment disposed beneath said tunnel and having extensions disposed along the side walls of said tunnel, the said extensions terminating at a substantial distance from the exit end of the tunnel.

Signed at Pittsburgh, Pa., this 12th day of June, 1926.

GEORGE E. HOWARD.